United States Patent
Moran

(10) Patent No.: US 11,040,262 B2
(45) Date of Patent: Jun. 22, 2021

(54) SPORTS BALL TRAINING OR SIMULATING DEVICE

(71) Applicant: Matthew Moran, Vernon, NY (US)

(72) Inventor: Matthew Moran, Vernon, NY (US)

( * ) Notice: Subject to any disclaimer, the term of this patent is extended or adjusted under 35 U.S.C. 154(b) by 0 days.

(21) Appl. No.: 16/448,938

(22) Filed: Jun. 21, 2019

(65) Prior Publication Data

US 2020/0398136 A1 Dec. 24, 2020

(51) Int. Cl.
*A63B 69/36* (2006.01)
*A63B 69/00* (2006.01)
*A63B 71/06* (2006.01)
*A63F 13/812* (2014.01)

(52) U.S. Cl.
CPC ...... *A63B 69/0091* (2013.01); *A63B 69/3661* (2013.01); *A63B 71/0622* (2013.01); *A63B 69/002* (2013.01); *A63B 2071/0694* (2013.01); *A63F 13/812* (2014.09); *A63F 2300/8011* (2013.01)

(58) Field of Classification Search
CPC ............ A63B 69/0091; A63B 69/3661; A63B 71/0622; A63B 2071/0694; A63B 69/002; A63F 13/812; A63F 2300/8011; A63F 13/98; A63F 13/218; A63F 13/245
USPC ........................................................ 473/446
See application file for complete search history.

(56) References Cited

U.S. PATENT DOCUMENTS

| | | | | |
|---|---|---|---|---|
| 2,362,064 A | * | 11/1944 | Giesinger | A63B 43/002 473/595 |
| 2,656,720 A | * | 10/1953 | Sonnett | A63B 69/0091 473/145 |
| 3,292,436 A | | 12/1966 | Bahnsen | |
| 3,526,991 A | | 9/1970 | Goldfarb et al. | |
| 4,120,489 A | * | 10/1978 | Borlinghaus | F16F 1/08 267/166 |
| 4,577,865 A | * | 3/1986 | Shishido | A63B 43/00 473/446 |

(Continued)

FOREIGN PATENT DOCUMENTS

| CN | 201058221 Y | 5/2008 |
|---|---|---|
| CN | 104707332 | 6/2015 |

(Continued)

OTHER PUBLICATIONS

Shu, Les, "Adidas' new Bluetooth soccer ball analyzes your kicks to help improve your game", Digital Trends, Jun. 12, 2014, Date Accessed: Jun. 18, 2019. https://www.digitaltrends.com/health-fitness/adidas-new-bluetooth-soccer-ball-analyzes-kicks-help-improve-game/.

(Continued)

*Primary Examiner* — Nini F Legesse

(74) *Attorney, Agent, or Firm* — Medley, Behrens & Lewis, LLC

(57) ABSTRACT

A ball training or simulating device is provided. The ball training or simulating device comprises a modified ball coupled to a base by a motion transfer member. The modified ball allows for a lower, more natural, ball position, while the shape, position, and configuration of the motion transfer member provide for a verisimilar kicking experience. The ball training and/or simulating device can be coupled to a computing device to allow input from the modified ball to be used in a simulated or augmented reality game.

20 Claims, 12 Drawing Sheets

(56) References Cited

U.S. PATENT DOCUMENTS

| | | | |
|---|---|---|---|
| 5,037,113 A * | 8/1991 | Sowards | A63B 69/0091 |
| | | | 473/423 |
| 5,435,572 A | 7/1995 | Covel | |
| 5,613,678 A * | 3/1997 | McKee | A63B 47/00 |
| | | | 473/397 |
| 5,810,685 A | 9/1998 | Willner et al. | |
| 5,951,414 A * | 9/1999 | Sowards | A63B 69/0091 |
| | | | 473/423 |
| 6,149,520 A | 11/2000 | Takatsuka | |
| 6,195,104 B1 | 2/2001 | Lyons | |
| D556,275 S * | 11/2007 | Crane | D21/707 |
| D562,419 S * | 2/2008 | Crane | D21/712 |
| D687,606 S * | 8/2013 | Burger | D30/160 |
| 8,758,172 B2 * | 6/2014 | Creguer | A63B 71/0622 |
| | | | 473/422 |
| D740,898 S * | 10/2015 | Westrom | D21/717 |
| 9,384,676 B2 | 7/2016 | Costain et al. | |
| 9,776,047 B2 * | 10/2017 | Krysiak | A63B 41/08 |
| 2004/0248661 A1 * | 12/2004 | O'Mahony | A63B 24/0021 |
| | | | 473/140 |
| 2006/0293124 A1 | 12/2006 | Mooney | |
| 2008/0180898 A1 | 7/2008 | Henderson | |
| 2009/0069123 A1 | 3/2009 | Nugent | |
| 2012/0122634 A1 * | 5/2012 | Lee | A63B 69/0091 |
| | | | 482/83 |
| 2013/0278494 A1 | 10/2013 | Huang et al. | |
| 2014/0274483 A1 * | 9/2014 | Ragen | A63B 69/0091 |
| | | | 473/438 |
| 2015/0054632 A1 | 2/2015 | Ezra | |
| 2017/0266528 A1 | 9/2017 | Westrom et al. | |
| 2018/0200583 A1 * | 7/2018 | Thurman | A63B 43/002 |

FOREIGN PATENT DOCUMENTS

| | | |
|---|---|---|
| DE | 202019102236 U1 | 6/2019 |
| WO | 3101779 A1 | 2/1991 |
| WO | 2008018773 A2 | 2/2008 |
| WO | 2014042402 A2 | 3/2014 |
| WO | 2016058064 A1 | 4/2016 |

OTHER PUBLICATIONS

Osborne, Doug, "Virtual Soccer Ball counts how good your soccer skills are", Geek.com, Apr. 27, 2009, Date Accessed: Jun. 18, 2019. https://www.geek.com/games/virtual-soccer-ball-counts-how-good-your-soccer-skills-are-755162/.

Namco, "World Kicks Operators Manual", 1999, Date Accessed: Jun. 18, 2019. https://www.gamesdatabase.org/Media/SYSTEM/Arcade/Manual/formated/World_Kicks_-_2000_-_Capcom.pdf.

Mitcalc, "Springs", Date Accessed: Jun. 18, 2019. http://www.mitcalc.com/doc/springs/help/en/springs.htm.

Katz, David A., "Chemistry in the Toy Store 6th Edition", 2002, Date Accessed: Jun. 18, 2019. http://chymist.com/Toystore%20part2.pdf.

Truestrike, "Driving Range", Date Accessed: Jun. 18, 2019. https://www.truestrike.com/driving-range-mats/.

D.W. Quail Golf, "Golf Mats, Nets, and Mirrors", Date Accessed: Jun. 18, 2019. https://dwquailgolf.com/golf-mats-nets-and-mirrors/.

Tour Greens, "Synthetic Turf Hitting Mats", Date Accessed: Jun. 18, 2019. https://www.tourgreens.com/synthetic-turf-hitting-mats.html.

Range Servant, "Golf Driving Range Mats", Date Accessed: Jun. 18, 2019, https://rangeservant.us/product-category/golf-range-accessories/golf-range-mats/.

Nagarajan, et al., "Design and Experimental Evaluation of Double Pig Tail Double Conical Spring Parameters (Abstract)", SAE Technical Paper 2013-26-0037, 2013. https://doi.org/10.4271/2013-26-0037.

Paredes, et al., "Optimal design of conical springs (Abstract)", Engineering with Computers, 2009, vol. 25, Issue 147, Springer-Verlag. https://doi.org/10.1007/s00366-008-0112-3.

Popfoam, "About", Date Accessed: Jun. 18, 2019. http://www.popfoam.com/about/.

Popfoam, "Materials", Date Accessed: Jun. 18, 2019. http://www.popfoam.com/materials/.

Popfoam, "Process", Date Accessed: Jun. 18, 2019. http://www.popfoam.com/process/.

Knapp, Gwen, "Building a Better Futbol", Sports on Earth, Jun. 19, 2013, Date Accessed: Jun. 18, 2019. http://www.sportsonearth.com/article/51102524/the-one-world-futbol-invented-by-tim-jahnigen-brings-recreation-to-impoverished-nations.

Bloom, Taylor, "The One World Futbol Project. A Technological Innovation that Could Touch the Lives of Millions", SportTechie, Apr. 8, 2013, Date Accessed: Jun. 18, 2019. https://www.sporttechie.com/the-one-world-futbol-project-a-technological-innovation-that-could-touch-the-lives-of-millions/.

Mueller, et al., "Breakout for Two", Media Lab Europe, Date Accessed: Jun. 18, 2019. https://web.media.mit.edu/~stefan/hc/handouts/BreakoutForTwo.pdf.

Machine Translation of WO2016058064A1 (4 pages).
Machine Translation of WO2014042402A2 (11 pages).
Machine Translation of CN104707332 (9 pages).
PCT Patent Office, "Invitation to Pay Additional Fees and, Where Applicable, Protest Fee", dated Aug. 11, 2020, 2 pages.
Thomas, Shane, "International Search Report and Written Opinion for PCT Patent Application No. PCT/ US20/38969", dated Feb. 26, 2021, 11 pages.

* cited by examiner

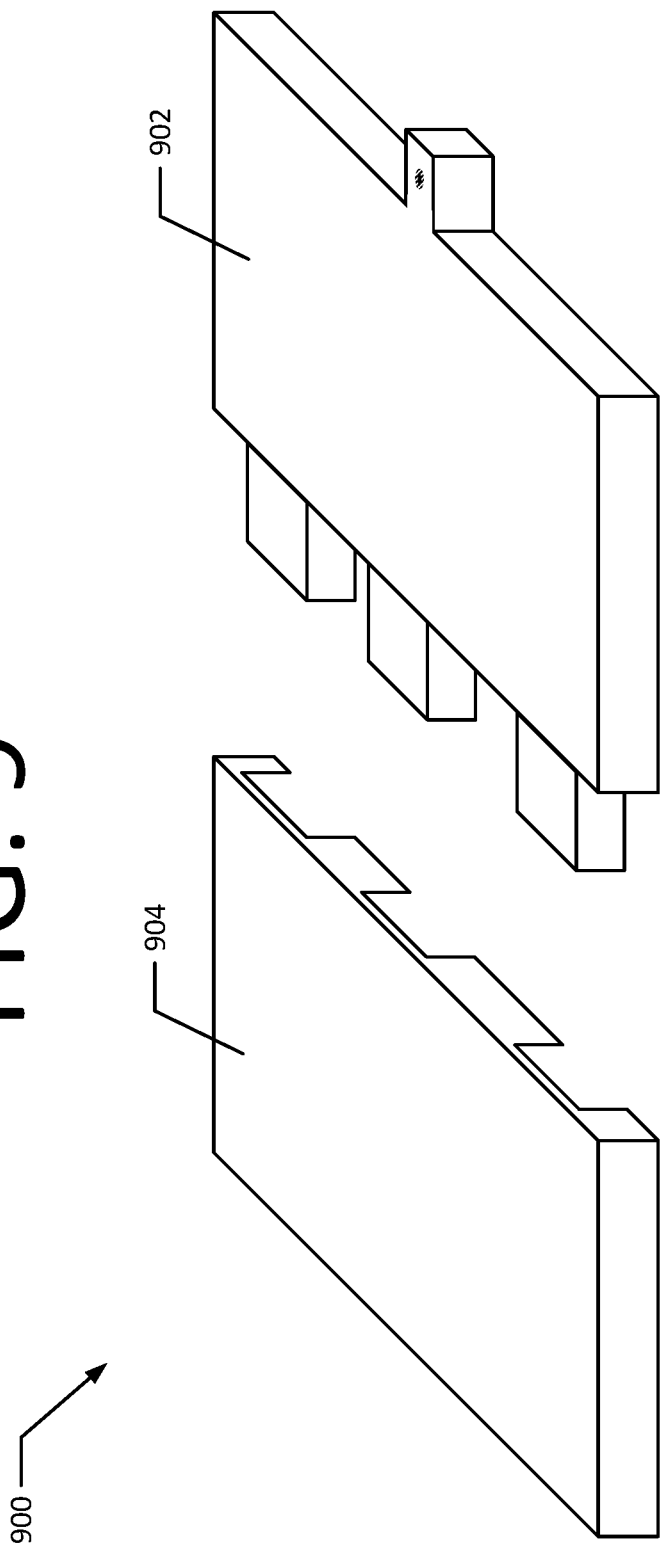

SPORTS BALL TRAINING OR SIMULATING DEVICE

FIELD

The present disclosure relates generally to sports training devices and simulation input devices.

BACKGROUND

Generally, athletic sports require many bodily motions, however, those who are training or playing sports often have stationary and/or indoor sports training devices, such as speed bags for boxing, golf swing simulators for golfing, or radar guns for baseball pitching. Furthermore, there are many game simulators that provide input for similar motions that are used in real-life sports. Console systems with motion or weight tracking exist, along with many games and simulations from the rapidly growing fields of virtual reality (VR) and augmented reality (AR).

However, issues with many sport training devices occur when addressing relationships between cost, compactness, and verisimilitude of a sports training device. For example, regarding soccer, running can be simulated in a multitude of ways. A large room may be utilized to accommodate for running, this allows for a high degree of verisimilitude, but presents a high level of cost and a low level of compactness. If instead a video game simulates running with an avatar who runs on a screen after a simulated soccer ball, this provides a low degree of verisimilitude, but a relatively low level of cost and a high level of compactness. It is desirable to achieve low costs and high degrees of compactness and verisimilitude. Conventional stationary ball training devices, such as stationary soccer ball training devices, have multiple drawbacks. The drawbacks include not providing a full range of motion when kicking the ball and not providing a natural ball position (e.g., a playing surface that is tangent to the soccer ball). Further, conventional sports ball training devices coupled with augmented reality (AR) capabilities tend to be cumbersome and expensive. In sports that contain prominent skills associated with a player's feet (e.g., skills such as running, ball handling, or kicking), it is desirable to have a compact sport training device that maximizes the realism of skills requiring the use of a foot when training, while still maintaining compact and affordable features.

SUMMARY

The following is a brief summary of subject matter that is described in greater detail herein. This summary is not intended to be limiting as to the scope of the claims.

In an embodiment, a ball training device includes: a motion transfer member mounted vertically and at least partially extending into a modified ball; and a base, coupled to a bottom portion of the motion transfer member. The modified ball is coupled to a top portion of the motion transfer member. The modified ball has a front half with a kicking or striking surface and a back half, the back half being truncated and having a maximum radius less than that of the front half.

In an embodiment, a system includes: a modified ball; a base; and a motion transfer member mounted vertically and at least partially extending into the modified ball. The modified ball is coupled to the base via the motion transfer member. The system also includes: a sensor configured to receive input when a user interacts with the modified ball, and a computing device configured to receive input from the sensor.

In an embodiment, a ball training device includes: a motion transfer member mounted to a modified golf ball; and a base, coupled to a bottom portion of the motion transfer member. The modified golf ball is coupled to a top portion of the motion transfer member. The modified golf ball has a front half with a striking surface and a back half, the back half being truncated and having a maximum radius less than that of the front half.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE FIGURES

FIG. 9 depicts an exemplary base for a ball training device.

DETAILED DESCRIPTION

Figure 1:
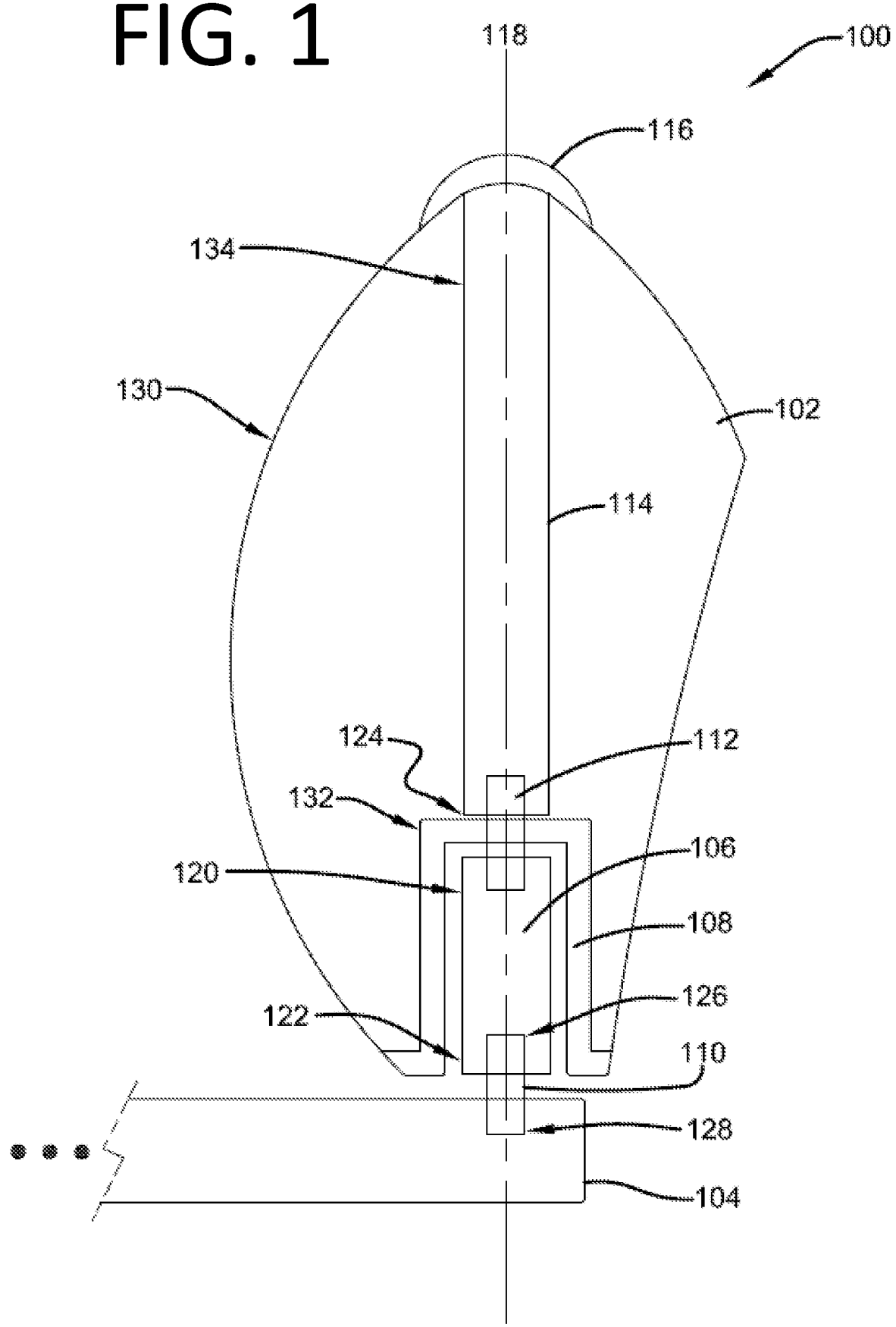
FIG. 1 depicts a cross-sectional view of an exemplary ball training device.

Various technologies pertaining to a sports ball training or simulating device are discussed, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a", "an" and "the", as used in this application and the appended claims, should generally be construed to mean "one or more" unless specified otherwise or clear from the context to be directed to a singular form. Further, as used herein, the term "exemplary" is intended to mean serving as an illustration or example of something and is not intended to indicate a preference.

The present disclosure describes improvements on conventional stationary ball training devices as well as innovative methods of interacting with a sports ball training device. A ball training device generally comprises a ball that is intended to be kicked, a base configured to be set on the ground or the floor, and a motion transfer member that connects the ball to the base. Conventional ball kicking training devices set a ball to an unnaturally high position. In contrast, the apparatus described herein recesses a motion transfer member (e.g., a spring) inside of a modified ball so that the modified ball may be set to a lower, more natural height, that is, a height that is closer to the base. Further, a ball of the apparatus described herein is modified such that there is less material on a backside portion (i.e., a portion of a ball that is opposite to where a kick is to be applied) of a modified ball than a similar conventional ball. The modified ball disclosed herein allows for a fuller range of motion when applying a kick. With the material from the backside of the modified ball removed, it allows the user to kick the ball and follow through without the ball hitting the floor and blocking the foot from following through.

Some sports ball training devices are coupled to a simulation of the sports ball. The simulation can be in the form of augmented reality (AR), virtual reality (VR), or other visual simulations, such as a video game. Conventional sports ball training devices that are coupled to simulations are cumbersome, commonly requiring an entire wall or even an entire room against which a ball maybe kicked or struck. The apparatus disclosed herein allows for a sports ball simulation that provides for a natural feeling kick or strike, a compact profile, portability, and affordability.

With reference now to FIG. 1, a cross-sectional view of an exemplary ball training device 100 is depicted in a general manner. The ball training device 100 comprises a modified ball 102. A modified football is shown in FIG. 1, but other balls, such as, for example, a modified soccer ball, a modified kickball, a modified American football, a modified rugby ball, a modified golf ball may be used. The modified ball 102 may be removably coupled to a base 104 via a motion transfer member 106. The motion transfer member 106 is configured to permit the modified ball 102 to flex or pivot with respect to the base 104. For example, the modified ball 102 can move from an initial position to a second position in response to an external force applied to the modified ball 102. The motion transfer member 106 can be further configured to reset the modified ball 102 from the second position to the initial position. This allows the modified ball 102 to have a range of motion when a force is applied to the modified ball 102. The motion transfer member 106 exerts a repositioning force to move the modified ball 102 back to the initial position along the axis 118. The ball training device 100 further comprises a vertical shaft 114 and a ball coupling device 116 that contributes to a durable, secure attachment, as well as a realistic tactile feel. Without the support of the vertical shaft 114, the top of the modified ball 102 would flex and/or collapse more readily than the bottom. However, in an embodiment, the modified ball 102 may include an internal rib structure to provide additional stiffness extending to the top of the modified ball 102. The rib structure may include numerous ribs running vertically along the interior of the ball. Thus, a kick directed to the top portion of the modified ball 102 without the vertical shaft 114 or internal rib structure could cause it to collapse and not move along a pivot point created by the motion transfer member 106.

The motion transfer member 106 is a movable member, such as a movable arm, a tiltable arm, a spring, or an elastomeric cord. In an embodiment, the motion transfer member 106 is a double conical spring or a single conical spring. In another embodiment, the motion transfer member 106 is a hydraulic arm that pivots about an axis. In another embodiment, the motion transfer member 106 is a series of elastic bands and coupled arms that store energy when a kick or strike is applied, and then release the energy after the kick or strike to bring the modified ball 102 back to an initial starting position. In yet another embodiment, the motion transfer member 106 is a double conical spring that is used in conjunction with an elastic-like material (e.g., latex rubber filled with gelled corn syrup, a flexible polymer, a rubber) which adds reinforcement as well as a means to distribute a force applied to the modified ball 102 when the force ultimately moves the motion transfer member 106. The motion transfer member 106 has a top portion 120 and bottom portion 122. The top portion 120 of the motion transfer member 106 is coupled to a bottom portion 124 of the vertical shaft 114. The bottom portion 122 of the motion transfer member 106 is coupled to the base 104. The motion transfer member 106 extends through an inner portion of the modified ball 102, in this case on a vertical trajectory through the axis 118.

A double conical spring has a thicker mid-section that tapers at terminal ends to a smaller diameter than the mid-section. A double conical spring with a larger diameter in the middle will encourage bending at the mid-section prior to bending at the terminal ends. This provides additional stability and stiffness at the coupling points at the terminal ends and also promotes bending at the mid-section. Conversely, a single conical spring has a flex point closer to the end with the larger diameter, and has a more variable natural movement. Double conical springs, in general, do not have standard design methodologies, analysis, or manufacturing data available. Furthermore, it is difficult to achieve required spring parameters like load at fitted heights, minimized transverse loads, coil diameter, and pitch as double conical springs can have variable pitch, coil diameters, and wire diameters. It is however observed that when the motion transfer member 106 is attached far enough into an interior of the modified ball 102 and is positioned such that its mid-section is on a plane with the bottom edge of the modified ball 102, this contributes to a more realistic kicking or striking movement and sensation since the pivot point is at or near the ground level.

To enhance the kicking movement and sensation the motion transfer member 106 is at least partially recessed into the modified ball 102. For example, the motion transfer member 106 can be recessed into the modified ball 102 such that 100% to 31%, such as 77% to 40%, or 45% to 60% of the motion transfer member 106 is recessed within the modified ball 102. In a particular embodiment, the motion transfer member 106 is 50% recessed within the modified ball, with the mid-section of the spring being on a level plan with an exterior surface of the modified ball 102. The ball training device 100 further comprises a housing 108 for the motion transfer member 106. The housing 108 is coupled to the modified ball 102 and is recessed into the bottom of the modified ball 102. In an embodiment, the housing 108 is adhered to an inner portion (not depicted) of the modified ball 102. In another embodiment, the housing 108 mechanically fastens together with an interlocking mechanical engagement (e.g., male-female complementary threading, snap fitting, press fitting, molding, latching fasteners). In another embodiment, the housing 108 comprises two pieces (not depicted) that are coupled to the modified ball 102 via screws. The screws may extend through a first piece of the housing 108 located in an outer portion of the modified ball 102, then extend through the modified ball 102 and into a second piece of the housing 108 located in an inner portion of the modified ball 102. The screws compress the first piece of the housing 108 and the second piece of the housing 108 against the modified ball 102. Alternatively, nuts and bolts can be used instead of screws.

The ball training device 100 further comprises a base coupling device 110 and a housing coupling device 112. An upper portion 126 of the base coupling device 110 at least partially extends into the bottom portion 122 of the motion transfer member 106 and a bottom portion 128 of the base coupling device 110 at least partially extends into the base 104. In an embodiment, the base coupling device 110 is a rod that has a diameter that is slightly larger than the diameter of an opening in the bottom portion 122 of the motion transfer member 106, and the base coupling device 110 is pressed into the bottom portion 122 of the motion transfer member 106. The base coupling device 110 can also be screwed into the motion transfer member 106 and secured by matching inclined screw threads, a pin, or some other coupling mechanism.

In an embodiment, the base coupling device 110 is coupled to the base 104. The base coupling device 110, may either be a part of the base 104 (e.g., the coupling device 110 is molded into the base 104) or be connected directly to the base 104 through a coupling mechanism. In an embodiment, the base coupling device 110 is inserted into the base 104 and is held in place by a pin that is inserted laterally through the base coupling device 110 such that the base coupling device 110 is secured to the base 104. In another embodiment, the base coupling device 110 is a male thread of a screw which is then threaded through complementing female threads located at the bottom portion 122 of the motion transfer member 106 and in the base 104.

In an embodiment, the housing coupling device 112 couples the housing 108 to the motion transfer member 106. In an embodiment, the housing coupling device 112 extends through the housing 108 and partially extends into the motion transfer member 106. In an embodiment, the housing coupling device 112 is threaded, extends upwards through the housing 108, and is coupled to the housing 108 with a corresponding threaded nut (not depicted) screwed onto the threads of the housing coupling device 112. In another embodiment, the housing coupling device 112 extends into the motion transfer member 106 (e.g., a double-conical spring) and is welded or chemically adhered to the motion transfer member 106.

The ball training device 100 further comprises the vertical shaft 114 and the ball coupling device 116. The vertical shaft 114 extends totally or partially through an upper portion 130 of the modified ball 102, down to an upper portion 132 of the housing coupling device 112. An upper end 134 of the vertical shaft 114 is coupled to the modified ball 102 and the bottom end 124 of the vertical shaft 114 is coupled to the motion transfer member 106. The vertical shaft 114 adds structural support to the modified ball 102. The ball coupling device 116 couples the vertical shaft 114 to the modified ball 102. In an embodiment, the vertical shaft 114 is 3 to 8 inches, such as 4 to 7 inches long, threaded, and feeds 3 inches into a 4 inch long at least partially threaded nut or other coupling device (not depicted). The housing coupling device 112 feeds 0.25 to 1 inches, such as 0.5 to 0.75 inches into the threaded nut. In a further embodiment, the ball coupling device 116 is a cap that follows the contour of the exterior surface, and that sits on top of the modified ball 102. The cap 116 has a portion (not depicted) in the center that extends downward into the modified ball 102 such that the vertical shaft 114 can be coupled to the portion in the center of the cap 116.

In an embodiment, one or more of the base coupling device 110, housing coupling device 112, or the ball coupling device 116 can be eliminated by molding or otherwise making integral with one or more of the parts they are coupling. For example, the housing coupling device 112 could be made integral with the vertical shaft 114.

Alternatively, or in addition to the vertical shaft 114, radial fins (not depicted) that extend from the top upper portion 130 of the modified ball 102 towards a lower portion 134 of the modified ball 102 can be used to add structural support to the modified ball 102.

Figure 2:
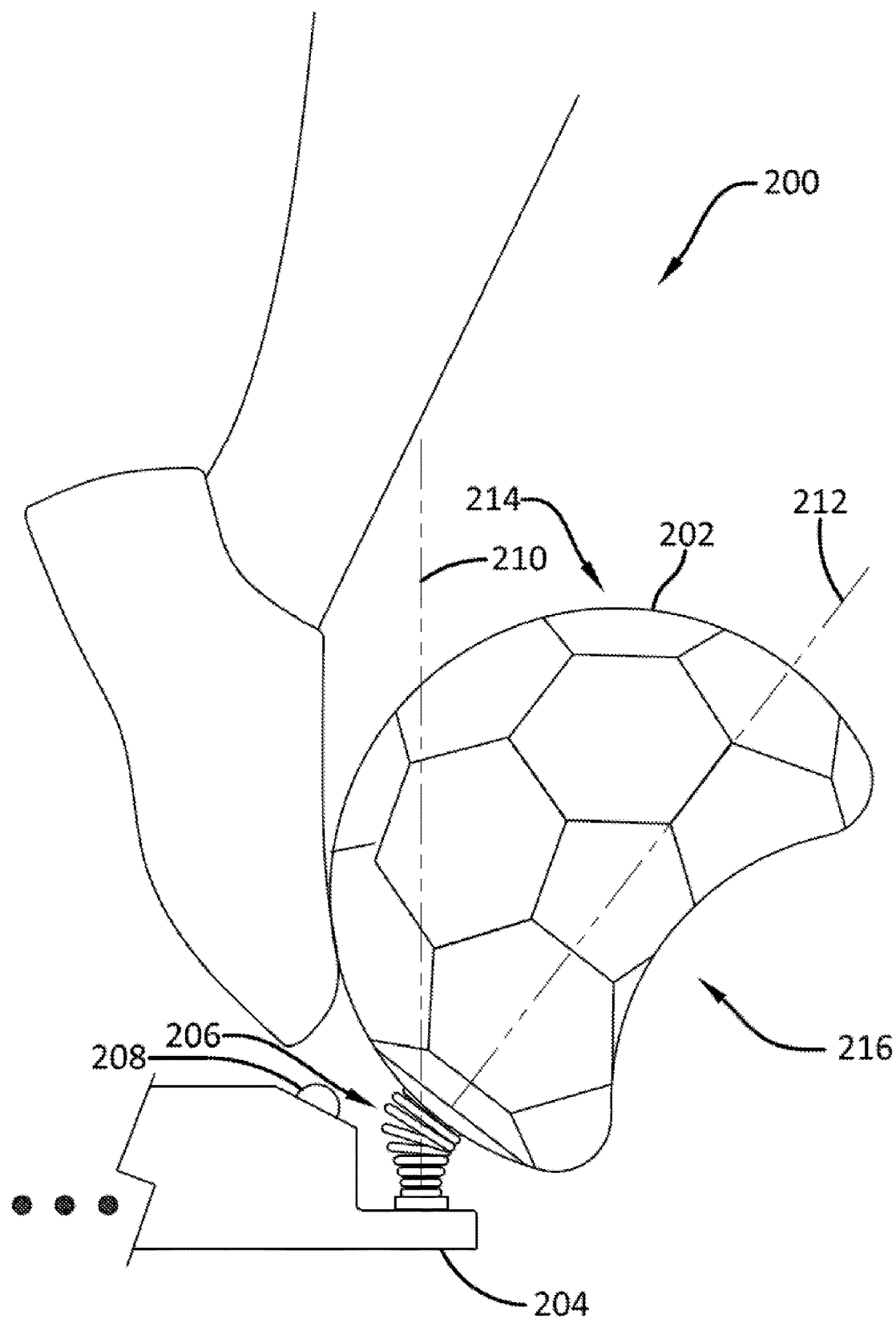
FIG. 2 depicts a lateral view of an exemplary ball training device after a force is applied.

With reference now to FIG. 2, a lateral view of an exemplary ball training device 200 as a force is applied is depicted. The ball training device 200 comprises a modified ball 202 (in this case a modified soccer ball), a base 204, a double conical spring 206, and a convex positioning device 208. The convex positioning device 208, as further described below, matches a concave positioning device that functions to guide the modified ball 202 back into an initial position after the force is removed. In an embodiment, the convex positioning device 208 is any protruding geometrical shape that is conducive to guiding the modified ball 202 back into place in the concave positioning device. Typically, the geometries of the concave and convex positioning devices 208 will be similar and have complementary curvature, including, for example, the round-shaped protrusion shown in FIG. 2, with a complementary round receptacle, a V-shaped groove concave positioning device with a complementary narrow V convex positioning device 208, or even a square-shaped protrusion with a complementary square-shaped receptacle.

When the modified ball 202 is in an initial position (as shown in FIG. 1), the modified ball 202 is aligned vertically, centered about a first axis 210. When a force (e.g., a kick) is applied to the modified ball 202 such that the modified ball 202 is set in motion, the double conical spring 206 tilts and flexes such that the modified ball 202 is centered about a second axis 212 which is different than the first axis 210, wherein the second axis 212 is dependent on an angle and force of the kick or strike. Most notably, the modified form of the modified ball 202 allows the modified ball 202 to go further down toward the ground or base 204, thereby allowing the user to follow through with the kick or strike with minimal (if any) additional resistance than an actual un-fixed ball.

The base 204 is set on the ground and can further be affixed to the ground. The base 204 is large enough to provide a stationary platform from which a user can position themselves to stand on and kick the modified ball 202. For example, the base 204 can be 2 ft to 6 ft wide and 2 ft to 8 ft long, or fall within a range of 4 to 36 square ft, such as 6 to 27 square ft or 10 to 20 square ft. The modified ball 202 is coupled to or near an edge of the base 204 such that a user can stand on the base 204 and deliver a kick to the modified ball 202 without the user having to leave the base 204. It is also envisioned that the modified ball 202 can be coupled to a lateral protrusion of the base 204. The modified ball 202 is centered above the lateral protrusion and is coupled to the base 204 via the base coupling device 110. The modified ball 202 may be centered above and 0.25 to 10 inches laterally from edge of the base 204, such as 1 to 5 inches, or 2 to 3.5 inches.

The double conical spring 206 has a free length parameter and a solid height parameter. A free length of a spring is a length of the spring when there is no load applied to the spring. A solid height of a spring is a length of the spring when the spring is fully compressed such that there is no more gaps between coils of the spring. The double conical spring 206 has a free length and a solid height that are equal or within ±30% equal to one another such as ±30%, ±20%, or ±10%. The solid height of the double conical spring 206 may be 1.5 to 8 inches, 2 to 6 inches, or 0.25 to 4 inches.

The double conical spring 206 comprises a wire which is coiled into a wire coil. The wire has a diameter of 0.05 to 0.25 inches, such as 0.1 to 0.2 inches, or 0.7 to 0.17 inches. The wire coil has a small outer diameter and a small inner diameter that are near the terminal ends of the double conical spring 206. In an embodiment, the small outer diameter is 0.5 to 1.5 inches, such as 0.6 to 1 inches, or 0.55 to 1.34 inches. In an embodiment, the small inner diameter is 0.1 to 0.7 inches, such as, 0.4 to 0.55 inches, or 0.25 to 0.65 inches. The wire coil further comprises a large outer diameter at its widest part near a center of the double conical spring 206. In an embodiment, the large outer diameter is 1 to 3 inches, 1.5 to 2 inches, or 1.2 to 1.7 inches. In an embodiment, the double conical spring 206 has a solid height of 1 to 6 inches, such as 1.5 to 5 inches, or 2.7 to 3.8 inches. In an embodiment, the double conical spring 206 has a solid height of 3.36 inches, a wire diameter of 0.15 inches, a small outer diameter of 0.8 inches, a small inner diameter of 0.5 inches, and a large outer diameter of 1.5 inches.

In use, the convex positioning device 208 promotes the modified ball 202 to quickly return to its initial position centered about the first axis 210. A user kicks (i.e., applies a force to) the modified ball 202 such that the modified ball 202 is set in motion. As a result of the kick, the double conical spring 206, which is coupled to the modified ball 202, stretches (as explained above) near the base 204 of the modified ball 202. The double conical spring 206 resists the compressing and/or stretching and exerts a force to bring the modified ball 202 back to rest, centered about the first axis 210. When the modified soccer ball recoils back towards the first axis 210 after the kick, the convex positioning device 208 is configured to restrict some oscillations that come about from the spring such that the modified ball 202 settles about the first axis 210 more quickly than if the convex positioning device 208 were not present. The convex positioning device 208 is discussed in more detail below.

In a further example, the exemplary ball training device 200 is configured with electronics, such as a sensor and a network communication interface. The sensor may, for example, be a motion sensor, an impact sensor, a gyroscopic sensor, an orientation sensor, an accelerometer, an optical sensor, other positions sensors, or a combination of any of these. Configured as such, the exemplary ball training device 200 detects and communicates motion or impact data to or with a computing device.

In an example, the computing device can be a computer processor configured to run a virtual simulation (e.g., virtual reality simulation or augmented reality simulation) that is displayed onto a visual display (e.g., a digital screen, a projection onto an object, or a virtual reality headset). The sensor then, via network communication, conveys the motion or impact force as input to the computing processor such that the force applied to the modified ball is simulated in the virtual simulation. In a more specific example, a kick applied to the modified ball 202 can be used as input to simulate a kick applied to a simulated ball.

It is further envisioned that the electronics may be coupled to the exemplary ball training device 200, or the electronics may be located external to the exemplary ball training device 200. The sensor may be mounted on or in the modified ball 202 itself, such as, on a front (kicking or striking) side 214 of the modified ball 202, so that it senses the impact of the kick or strike; on a back side 216 of the modified ball 202 so that it senses when the back side 216 hits the base 204 or the ground; as sensory skin on an exterior surface of the modified ball 202, e.g., to detect an impact delivered anywhere on the surface of the modified ball; on a bottom side of the modified ball 202 or the positioning device 208, e.g., to detect when the modified ball 202 leaves or returns to the first axis 210; or inside the modified ball 202, in various configurations.

In yet another embodiment, optical sensors external to the modified ball 202 and external to the base 204 can convert motions associated with the modified ball 202 and motions associated with a user into input data for a computing device. In a further embodiment, sensors are placed externally, e.g., to detect the impact of the back side 216 of the modified ball 202 on the base 204 or a mat placed under and where the back side 216 of the modified ball 202 would hit the ground when kicked or struck. In another further embodiment, sensors are placed externally of the exemplary ball training device 200, the sensors convert motions associated with a user to motions associated with a simulation of the user. The sensors further sense motions and forces applied to the modified ball 202 and convert said motions and forces into simulated motions, forces, and trajectories applied to a simulated ball. A computing device can then cause the simulations to be depicted onto a display (e.g., a digital screen, a projection onto an object, or a virtual reality headset) and can additionally or independently provide analysis of the sensed motions and forces. This analysis can be used to inform the user what aspects of their form needs to be worked on.

In an embodiment, the base 204 is a 3 ft wide by 5 ft long base which comprises pressure sensors distributed within the base 204, such that a user standing on the base 204 can actuate a pressure sensor. The base 204 is configured to be placed on a floor or the ground, both of which should be substantially flat. In an embodiment the base 204 includes a standing surface, where a user can stand to kick the modified ball 202, using their own weight on the base 204 to anchor the base 204 in place. The base 204 can be broken into multiple pieces for storage and connected via a mechanism, such as one or more tongue-in-groove features, or e.g., a hinge, such as a piano hinge device. In an embodiment, the base 204 is substantially flat. In an embodiment, the base 204 is covered with an artificial turf surface. The base 204 should be relatively low in height, so as to prevent injuries from partially stepping off or falling off the base 204. The base 204, may have a height of 0.25 inches to 3 inches, such as 0.5 to 2.75 or 1 to 2 inches.

In another embodiment, the exemplary ball training device 200 may be coupled to a treadmill. The treadmill can be a unidirectional treadmill or a multidirectional treadmill. When coupled to the treadmill, a user can introduce a running aspect to the exemplary ball training device 200 whilst still maintaining a compact profile. In an embodiment, a user can run on a multidirectional treadmill and perform kicks to the exemplary ball training device 200 to play in a virtual or augmented reality soccer game.

Figure 3:
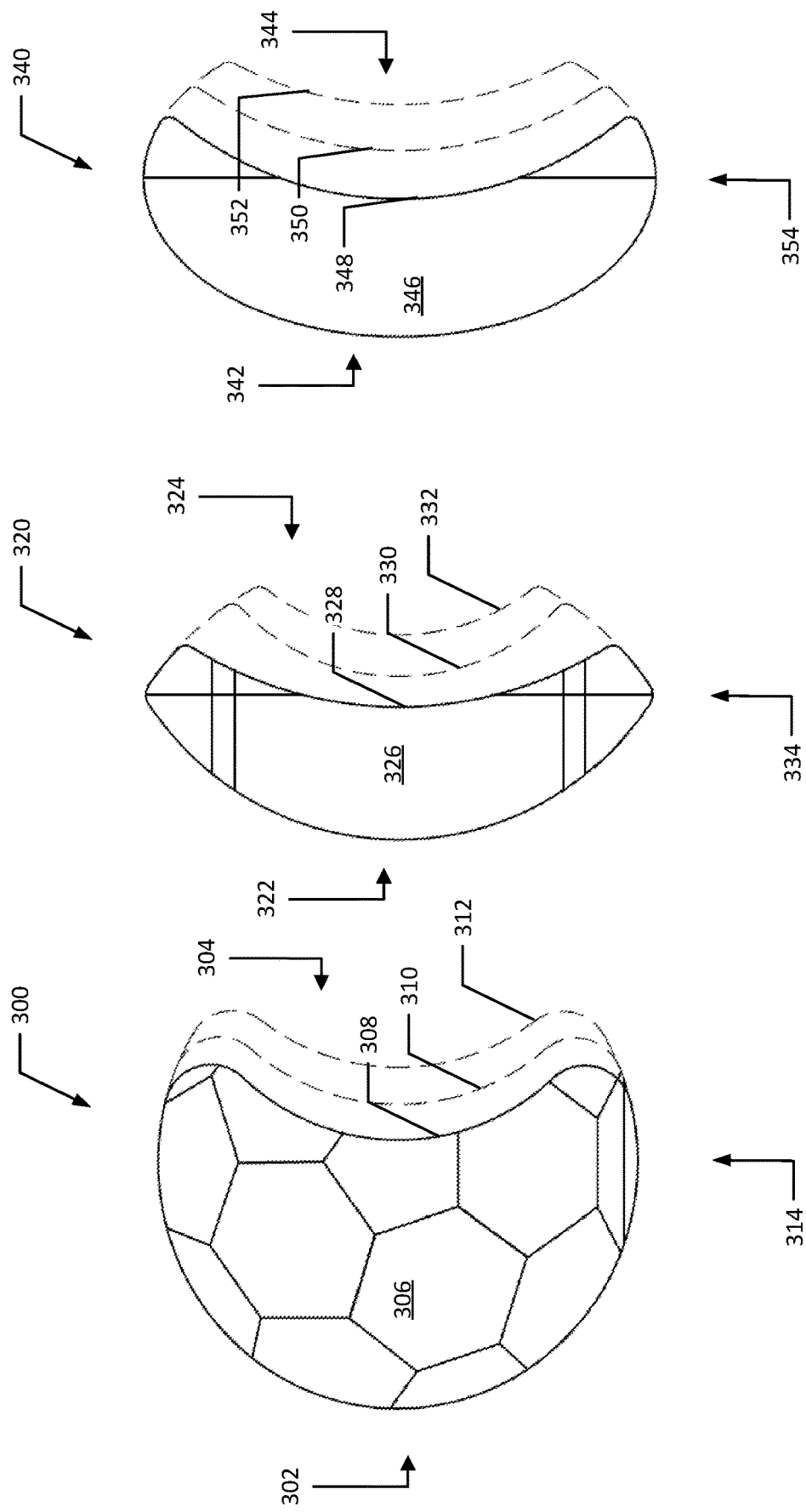
FIG. 3 illustrates lateral views of multiple exemplary shape modifications to different types of sports balls.

With reference now to FIG. 3, lateral views of multiple exemplary shape modifications to different types of sports balls are illustrated. A modified soccer ball 300 is depicted. The modified soccer ball 300 has a decreased exterior surface area compared to a conventional ball of the same maximum radius. The modified soccer ball 300 has a front half 302 and a back half 304. The front half 302 is configured to receive the kicking impact (i.e., facing the user and including or facing the positioning device 208). The back half 304 is configured to impact or come closest to impacting the base 204 or ground. The modified soccer ball 300 has a spherical segment on the front half 302 that is the kicking surface 306. A portion of the back half 304 may also include a kicking surface, but a portion of the back half 304 of the modified soccer ball 300 is non-spherical and is a truncated sphere.

In other embodiments of the modified ball, other geometries will have a front half 302 that is essentially the shape of a conventional ball, e.g., football or rugby ball, prolate spheroids, and the back half 304 is a truncated or otherwise reduced volume version of the same ball. In an embodiment, the back half 304 has an at least partially hollow configuration. In an embodiment, the modified ball 300 has less exterior surface area of a conventional ball of the same maximum radius. In any case, the modified ball is configured to bend further towards the ground or base before hitting the ground or base compared to a conventional ball. The back half 304 has a maximum radius less than that of the front half 302.

In an embodiment, for example, a regulation size 5 soccer ball with an 11 cm radius, or 22 cm diameter has a total surface area of approximately 1521 cm$^2$, and a half surface area of approximately 761 cm$^2$. The total surface for a regulation size 5 soccer ball corresponds to its total kicking surface area. A modified soccer ball 300 with the same maximum radius as a size 5 soccer ball will have a kicking surface area that is anywhere between 761 cm$^2$ and 1521 cm$^2$, such as, for example, 800 to 1300 cm$^2$, or 900 to 1200 cm$^2$. The kicking surface area of the front half 302 is greater than the kicking surface area of the back half 304. The modified soccer ball 300, or more generally, any modified ball, may have a kicking surface area that is 99% to 50% of a conventional ball of the same maximum radius, such as 90% to 55%, 80% to 60%, or 75% to 65%. The modified soccer ball 300, or more generally, any modified ball, may have a total radial thickness of 55 to 98% of a matching (same maximum radius) spherical or otherwise conventionally shaped ball, such as 95% to 60%, 85% to 65%, or 80% to 70%. The front half 302 of the modified soccer ball 300, or more generally, any modified ball has a front half 302 that is 100% of a matching spherical or otherwise conventionally shaped ball, and the back half 304 has the entirety of the reduced radial thickness disclosed above.

Some exemplary modified soccer ball 300 shapes are depicted in the forms of first, second, and third shapes 308, 310, and 312. Further, a modified American football 320 is also depicted, with first, second and third shapes 328, 330, 332. The modified American football 320 can be a shape from a range of shapes such that the exterior surface area of the modified American football 320 is greater than the exterior surface area of half an American football and less than the exterior surface area of a full American football. The modified American football 320 has a front side 322, a back side 324, and a kicking surface 326. Similarly, a modified rugby ball 340 is also depicted with first, second, and third shapes 348, 350, and 352. The modified rugby ball 340 can be a shape from a range of shapes such that the exterior surface area of the modified rugby ball 340 is greater than the exterior surface area of half a rugby ball and less than the exterior surface area of a full rugby ball. The modified rugby ball 340 has a front side 342, a back side 344, and a kicking surface 346.

The modifications of the modified soccer ball 300, the modified American football 320, and the modified rugby ball 340 are an improvement over conventional ball training devices as a modification made to the shape of the modified balls simultaneously allows for a larger range of motion when applying a force to a modified ball while also allowing the lowering of the modified ball to a more "natural" ball position (i.e., closer to a ground level). While practically there is often a need to have some material on a back surface (e.g., the back halves 304, 324, 344) for anchoring it to a remainder of a ball training device, the less material at a bottom (e.g., a bottom portion 314, 334, 354) of the back surface (e.g., the back halves 304, 324, 344) the lower a modified ball (e.g., one of the modified balls 300, 320, 340) can pivot towards the ground. In an embodiment, the bottom portion 314, 334, 354 has a smaller radius than the upper half of a modified ball. It is noted that the modified balls 300, 320, 340 may have exposed hollow interiors, hollow interiors that are not exposed (i.e., covered with a material on a modified side of a modified ball), or no hollow interiors.

It is further envisioned that a bottom portion 314 of the modified soccer ball 300, a bottom portion 334 of the modified American football 320, and a bottom portion 354 of the modified rugby ball 340 can be partially flattened. A partially flattened bottom portion can allow for an even lower ball position. In an example, when practicing kicking of an American football, it is known that a "sweet spot" to which a kicker should aim for is located 1.5 to 4 inches, e.g., 1.8 to 3.8 inches or 2 to 3.5 inches from a bottom tip of a conventional American football. As such, the modified American football 320 may truncate 0.5 to 3 inches, such as 0.75 to 2 inches, or 1 to 1.75 inches above where a bottom tip of a conventional American football is normally located, since providing a kick to the bottom tip of an American football is undesirable and would cause it to "pop" up into the air (if not coupled to the base).

Figure 4:
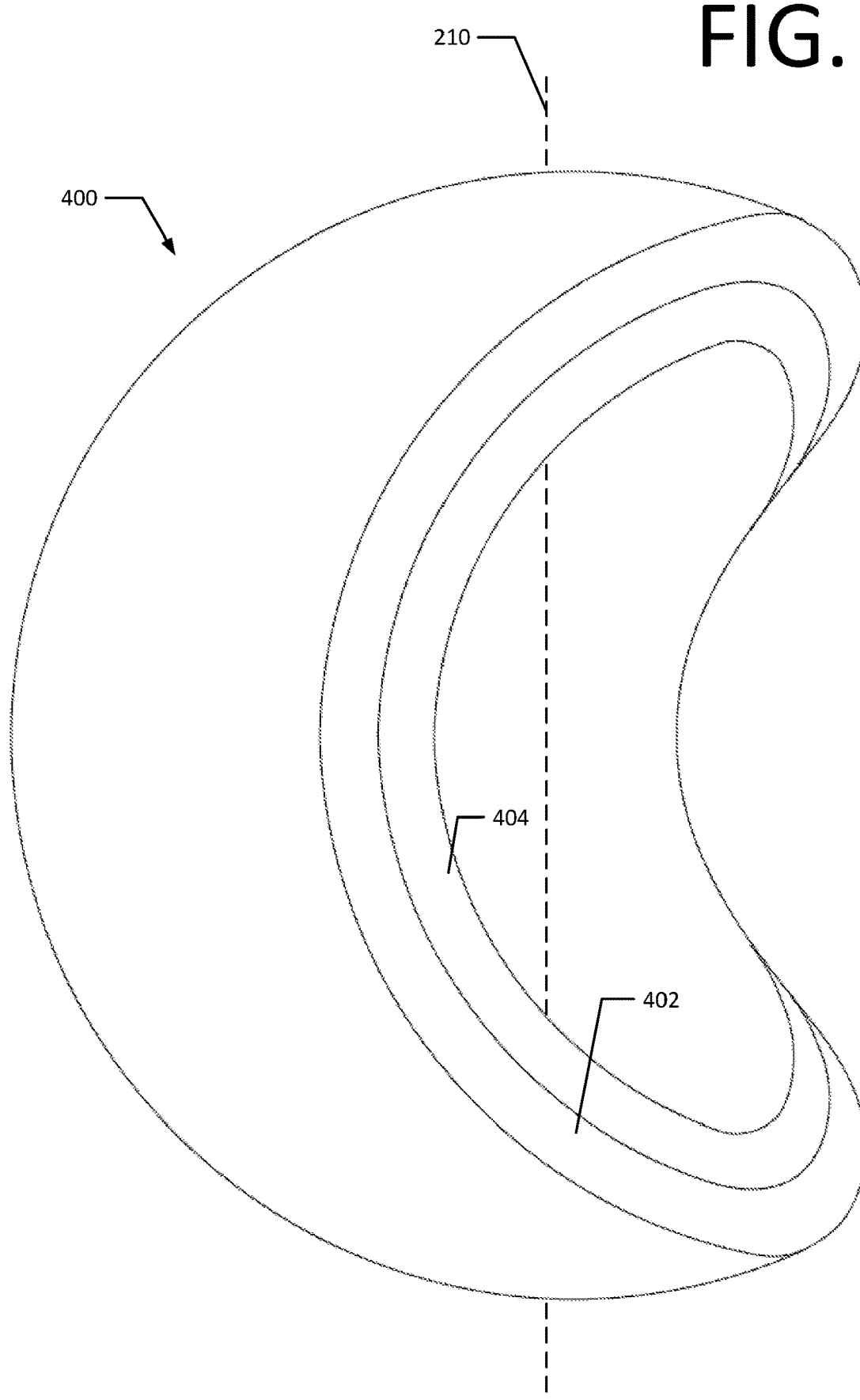
FIG. 4 depicts a partial cross-sectional view of layers of an exemplary modified ball.

With reference now to FIG. 4, a cross sectional view revealing layers of a modified ball 400 is depicted. The modified ball 400 comprises an outer layer 402 and an inner layer 404. The inner layer 404 is stronger than the outer layer 402, wherein strength herein is determined by the ASTM 3574-D. The outer layer 402, for example, may be leather or a simulation leather material, while the inner layer 404 is a polyurethane or other cellular foam. In an embodiment, the inner layer 404 and outer layer 402 materials are selected and configured with the vertical shaft 114 such that the ball is not pneumatically inflated but approximates the feel of a pneumatically inflated ball.

The modified ball 400 may comprise at least one of a plurality of materials such as composite plastics, silicone rubber, polyurethane, NERF foam-type cellular materials, a POPFOAM material, neoprene, open cell foam, closed cell foam, crosslinked foam, non-crosslinked foam. NERF materials are a reaction product of polyester resin with another compound in the presence of $CO_2$. POPFOAM materials are an ethyl vinyl acetate (EVA) blend compounded with microcellular agents.

It is further envisioned that there may be more layers than the outer layer 402 and the inner layer 404. In an example, there may be a second inner layer that is nearer a center of the modified ball 400 than the inner layer 404 and a third inner layer that is nearer the center of the modified ball 400 than the second inner layer.

In an embodiment, a hollow portion within the modified ball 400 may be filled with a material, consequently, ridding the modified ball 400 of the hollow portion. It is also envisioned that electronics may be housed within a hollow of the modified ball 400. In an embodiment, foam may be used to fill in the hollow portion to protect the electronics. It is to be noted that a modified ball 400 may comprise only a single layer. When at least two layers are present, such as an outer soft skin and an inner rigid structural shell, an inner layer 404 may provide structural integrity for a ball, while an outer layer 402 can allow for a surface with a softer surface and/or a surface with a high resistance to scratching and marring. Both are desirable, when kicking a ball, so as to prevent a serious foot injury due to striking a hard surface and to promote durability of the modified ball 400. It is also envisioned that there may be a continuum of "layers." For example, the continuum of layers may comprise a continuum of strengths such that the outer most layer of the continuum of layers is less strong than the innermost layer of the continuum of layers.

Figure 5:
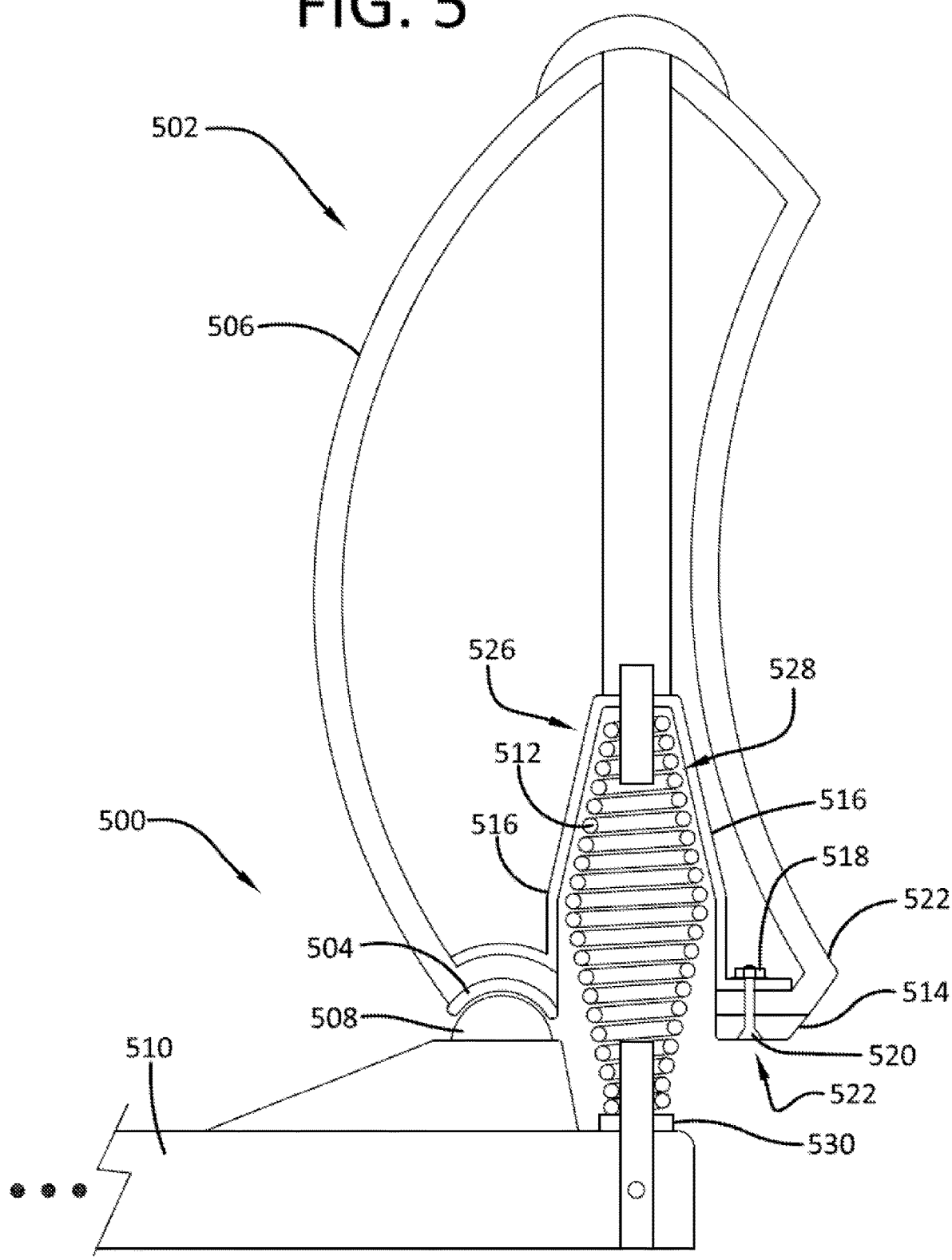
FIG. 5 is a cross-sectional diagram of an exemplary positioning device applied to an exemplary ball training device.

With reference now to FIG. 5, an exemplary positioning device 500 applied to a sports ball training device 502 is illustrated. The positioning device comprises a first component 504 that is coupled to a modified ball 506 and a second component 508 that is coupled to a base 510. The first component 504 and second component 508 are configured to be in a nested configuration when the modified ball 506 is in the initial (upright, un-kicked) position. In an embodiment, the first component 504 is a convex protrusion whose general shape nests within the second component 508, wherein the second component 508 is a concave cavity.

In another embodiment, the first component 504 is a concave cavity and the second component 508 is a convex protrusion. Similar to the previous embodiment, the general shape of the first and second components 504, 508 allows for the second component 508 to nest within the first component 504. It is also envisioned that the first component 504 may instead be integrated into a shape of the modified ball 506 instead of being coupled to the modified ball 506. It is also envisioned that the second component 508 may be integrated into a shape of the base 510 instead of being coupled to the base 510.

In another embodiment, the first component 504 is a magnetic material and the second component 508 is an electromagnet configured to interface with the first component 504. In yet another embodiment, the first component 504 is an electromagnet and the second component 508 is a magnetic material which is configured to interface with the electromagnet. The first and second components 504, 508, may also be permanent magnets aligned for attraction.

The sports ball training device 502 also comprises a double conical spring 512 and a housing for the double conical spring 512. The housing comprises a first piece 514 of the housing and a second piece 516 of the housing that are coupled to the modified ball 506 via a nut 518 and bolt 520; though not depicted in FIG. 5, there can be multiple nuts and bolts coupling the first piece 514 of the housing to the second piece 516 of the housing. As depicted the first component 504 of the exemplary positioning device 500 is molded into the first piece 514 of the housing. The bolt 520 extends through the first piece 514 of the housing located in an outer portion of the modified ball 506, then extend through a layer 522 of the modified ball 506 and into the second piece 516 of the housing located in an inner portion 524 of the modified ball 506. The nut 518 and bolt 520 compress the first piece 514 of the housing and the second piece 516 of the housing against the modified ball 506, securing the housing in place. Alternatively, screws can be used instead of nuts and bolts. A top half portion 526 of the first piece 514 tapers around a top half portion 528 of the double conical spring 512. The sports ball training device 502 further comprises a washer 530 between the base 510 and the double conical spring 512. The washer 530 provides for consistent spacing between the double conical spring 512 and the base 510 as well as extra durability for when the double conical spring 512 is pressed up against the base 510, either during an impact, such as a kick, or during manufacturing when the double conical spring 512 is coupled to the base 510.

Figure 6:
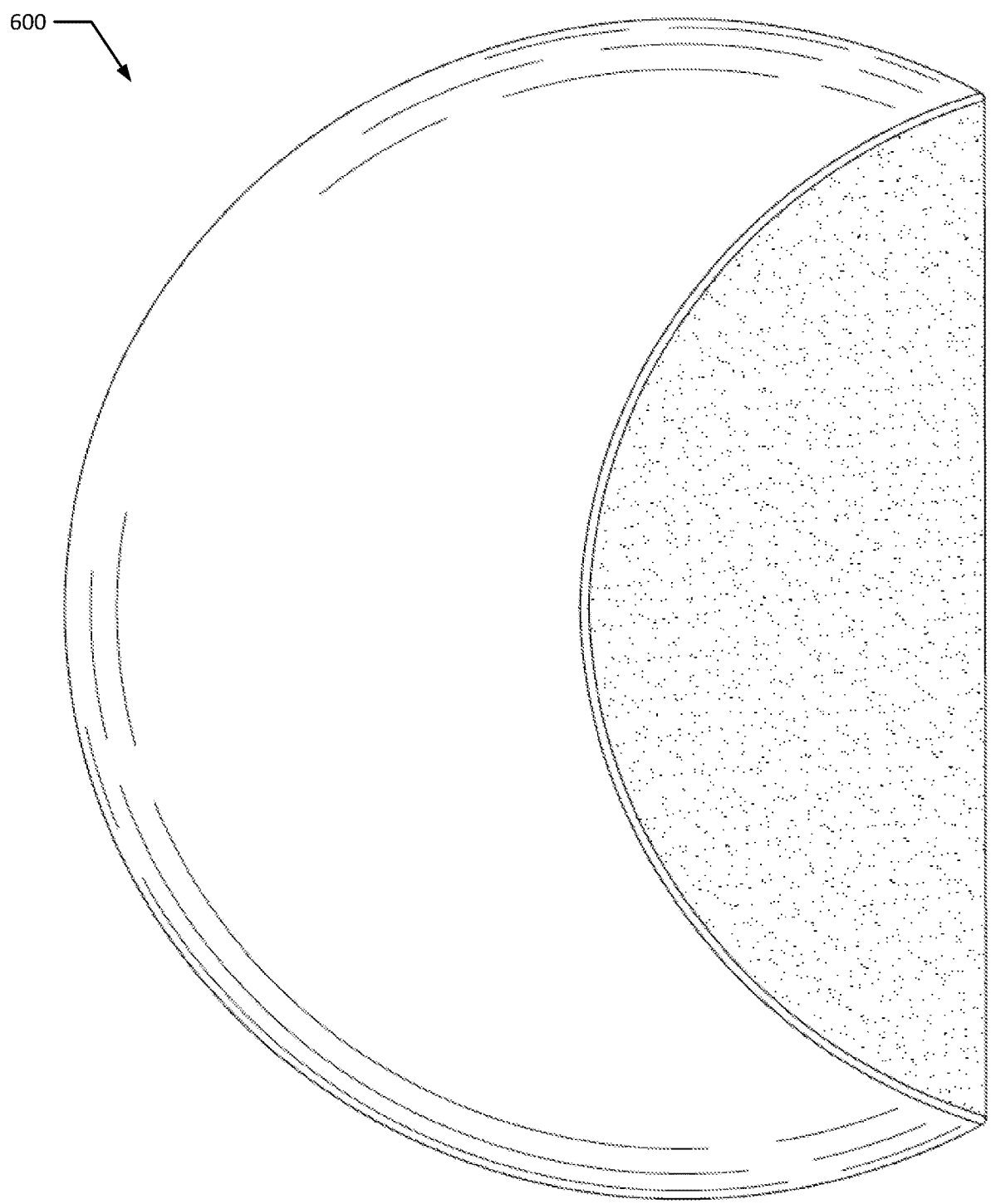
FIG. 6 is a lateral view of an exemplary modified ball.

With reference now to FIG. 6, an exemplary modified ball 600 is depicted. A first portion 602 of the modified ball 600 resembles a shape of a conventional soccer ball, while a second portion 604 of the modified ball 600 depicts a face of a "truncated" sphere.

Figure 7:
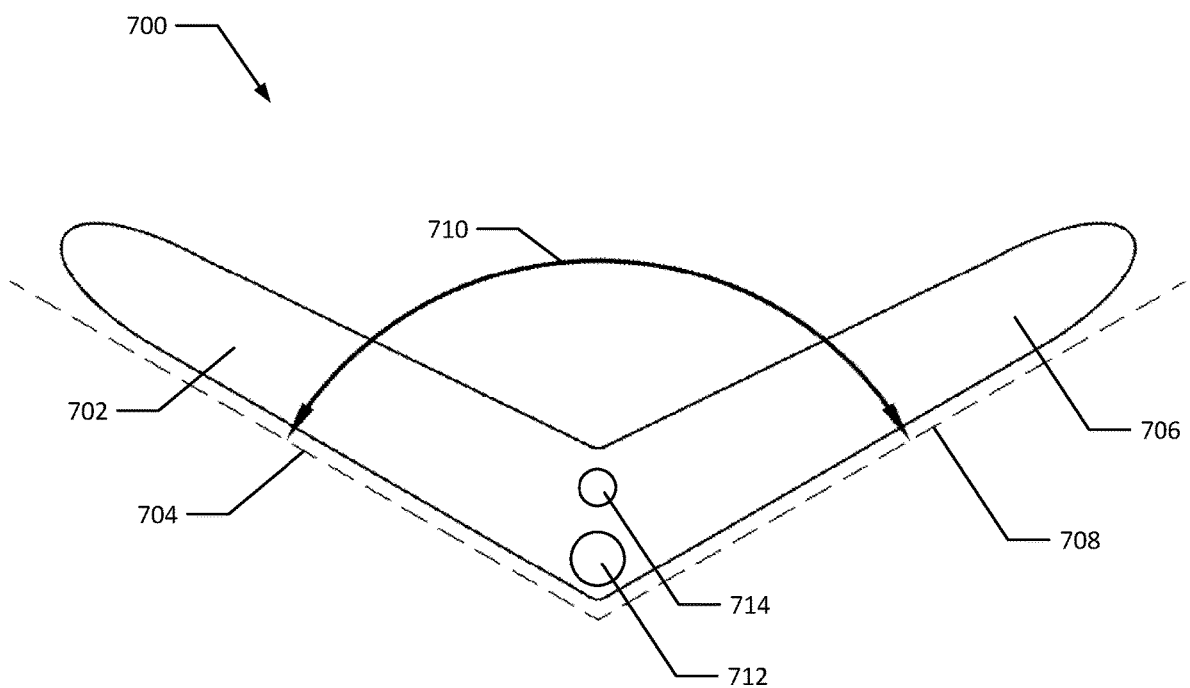
FIG. 7 is a top-down view an exemplary base for a ball training device.

With reference now to FIG. 7, an exemplary base 700 for a ball training device is illustrated. The exemplary base 700 comprises a first lateral projection 702 aligned with a first axis 704 and a second lateral projection 706 aligned with a second axis 708, wherein there is an angle 710 between the first axis 704 and the second axis 708. The angle 710 is greater than 30 degrees and less than 180 degrees. For example, the angle 710 may be in the range of 45 to 160 degrees, 60 to 135 degrees, or 90 to 125 degrees. In an embodiment, the first and second lateral projections 702, 706 may include an elastomeric material as a bottom layer, or an elastomeric material as an end portion with a flat bottom to provide better grip to prevent movement of the base 700.

At an intersection of the first lateral projection 702 and the second lateral projection 706 is an anchoring device 712. In an embodiment, the exemplary base 700 is made more stable by being weighted and the anchoring device may be optional. In another embodiment, the exemplary base 700 is made more stable by being anchored to the ground. In a more specific embodiment, the anchoring device 712 is a stake driven through the exemplary base 700 into the ground. In an example, the exemplary base 700 is placed onto a grass lawn (i.e., the ground), and a stake is driven through the base into the ground. A modified soccer ball is also coupled to the base 700 via a central connection point 714 at the intersection. A user can kick the modified soccer ball and train different kicks with the modified soccer ball.

Figure 8A:
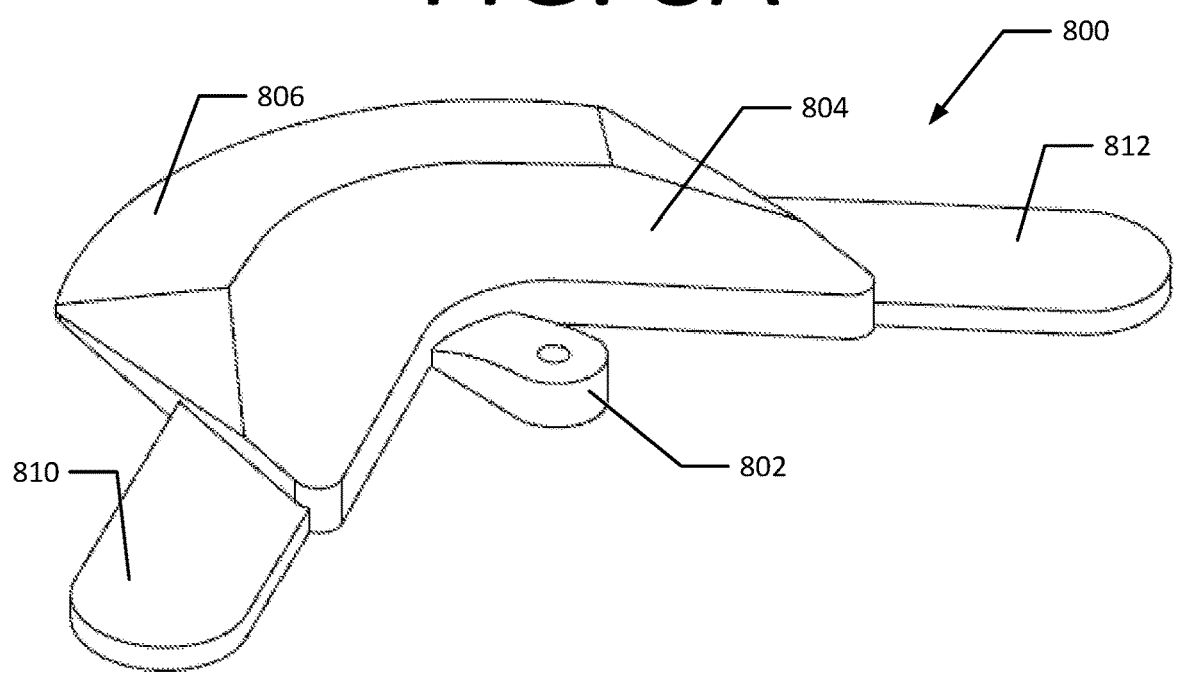
FIGS. 8A and 8B depict perspective views of an exemplary base for a ball training device.
Figure 8B:
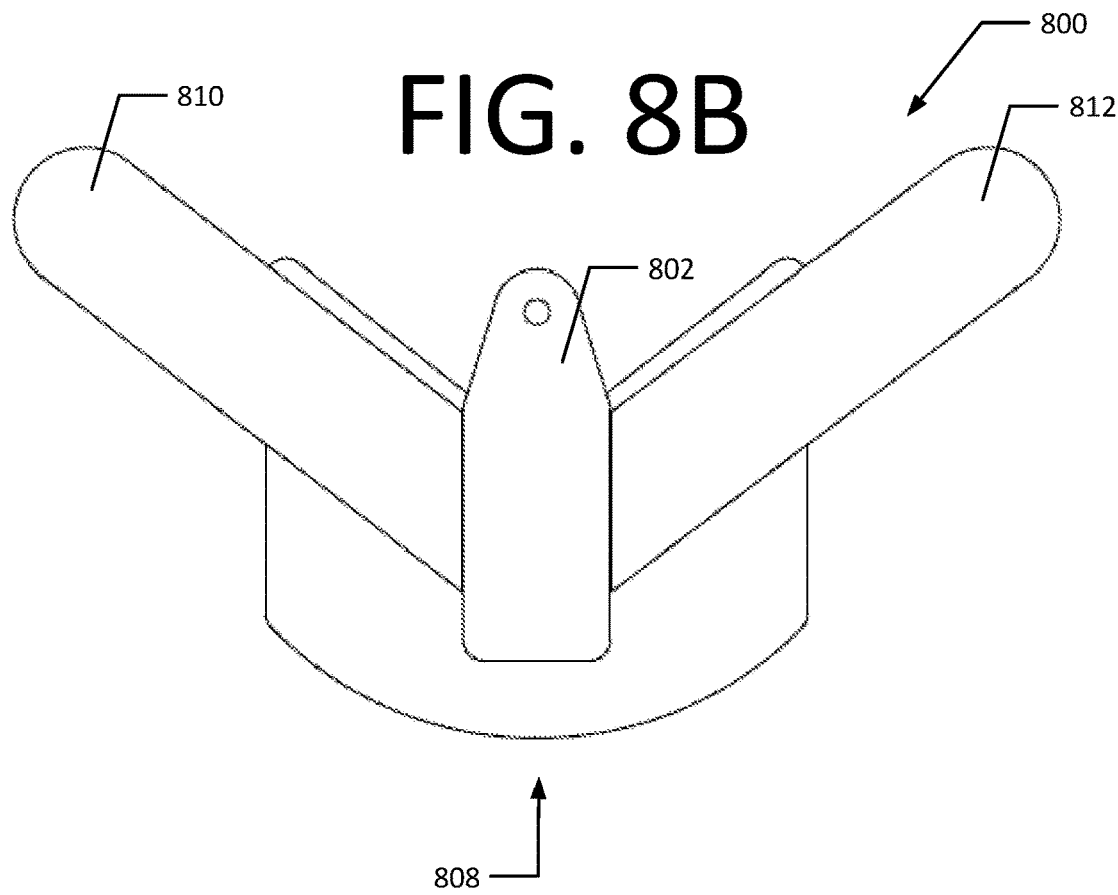

With reference now to FIG. 8A and FIG. 8B, FIG. 8A is a perspective view of an exemplary base 800. FIG. 8B is a bottom-up view of the exemplary base 800. The exemplary base 800 is similar to the exemplary base 700 yet further comprises a central protrusion 802 for mounting a modified ball (not depicted) and a semicircular portion 804 comprising a beveled edge 806 on a front side 808 of the exemplary base 800. The exemplary base 800 is weighted and may also include a high friction surface on the bottom (e.g., an elastomer with a low glass transition temperature).

The exemplary base 800 comprises a first lateral protrusion 810 and a second lateral protrusion 812. The exemplary base 800 can be used with or without the first and second lateral protrusions 810, 812. Having the first and second lateral protrusions 810, 812 allows for more stability when a force coming from the side is applied to a ball attached to the exemplary base 800. Further, having the first and second lateral protrusions adds to the weight of the exemplary base 800, which inherently increases stability. It is envisioned that the first and second lateral protrusions 810, 812 can be modular, or they can be folded, swiveled, telescoped away to allow for a more compact shape of the exemplary base 800. In an embodiment, a user can stand on an existing ground/surface instead of on top of a base platform (e.g., the base 104, the base 204, the base 510). The beveled edge 806 allows for a smooth natural transition from the existing ground/surface through the exemplary base 800. These features make the exemplary base 800 more portable and easier to set up than other embodiments, such as, for example, the base 204 of FIG. 2. It is also envisioned that just the semicircular portion 804 can be used as a base (i.e., without the first and second lateral protrusions 810 and 812).

Referring now to FIG. 9, an exemplary base 900 is depicted. The exemplary base 900 comprises multiple pieces that can be coupled together. As depicted, the exemplary base 900 comprises a first piece 902 and a second piece 904 that couple together via tongue and groove joints. In another example, the exemplary base 900 comprises four pieces that couple together via magnets. In yet another example, the exemplary base 900 comprises three or more pieces that are coupled together via a flexible material that allows for the exemplary base 900 to fold or join together in an accordion like manner.

Figure 10B:
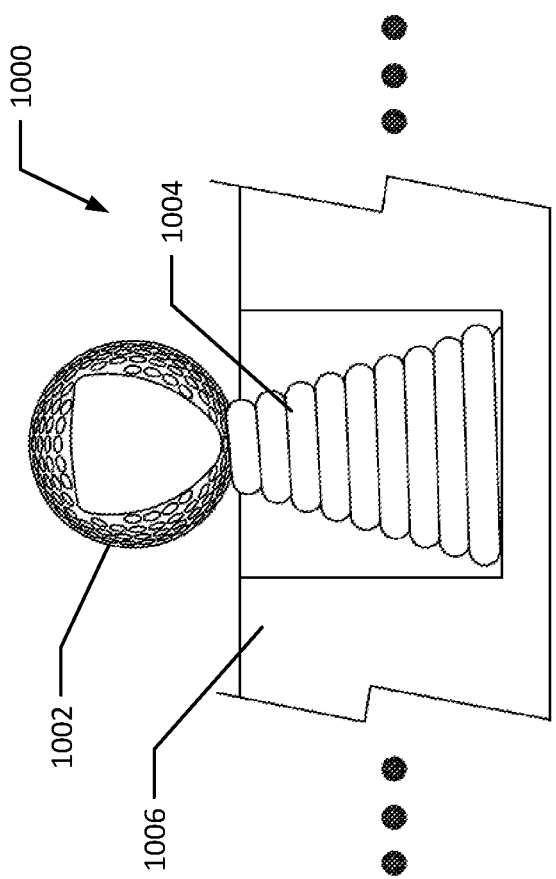
FIG. 10B is a cross-sectional view of the golf ball training device of FIG. 10A.
Figure 10A:
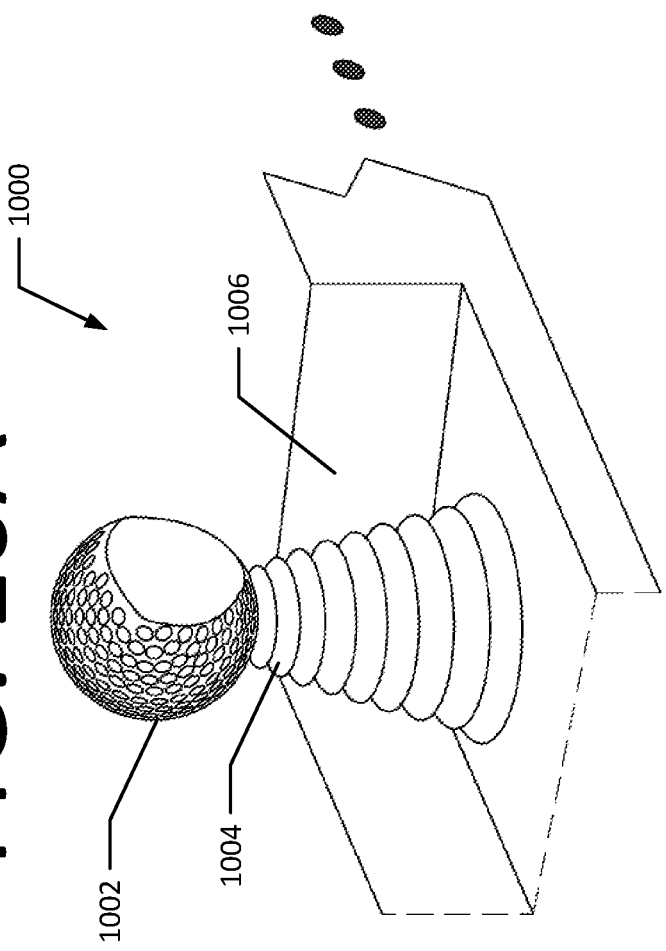
FIG. 10A is a perspective view of an exemplary golf ball training device.

Referring now to FIG. 10A, a perspective view of a partial cross section of an exemplary golf training device 1000 is depicted. Alternative to having a sports ball training device that requires kicking, the technology described herein can also be applied to a golf ball that is struck by a golf club. The exemplary golf training device 1000 comprises a modified golf ball 1002, a conical spring 1004, and a base 1006. The modified golf ball 1002 is coupled to the conical spring 1004 and the conical spring 1004 is coupled to the base 1006. The modified golf ball 1002 can be coupled to the base 1006 as the modified ball 102 is coupled to the base 104 from FIG. 1. It is also envisioned that the modified golf ball 1002 can comprise a monolithic interior allowing it to be threaded onto the conical spring 1004, and/or the modified golf ball 1002 can be chemically adhered to the conical spring 1004. A shape of the modified golf ball 1002 is modified in the same manner as the exemplary balls depicted in FIG. 3.

The conical spring 1004 can be recessed into the base 1006, the recessing of the conical spring 1004 can be adjusted by adjusting the thickness of the base 1006 (e.g., adding padding or material atop the base 1006, by coupling a height adjustable device between the conical spring 1004 and the base 1006). In an embodiment, a top surface of the base 1006 is configured for a user to stand on, and a bottom portion of the motion transfer member is coupled to a recessed portion of the base 1006. Further, the base 1006 can be fitted or covered with artificial turf so as to imitate a golfing green. The artificial turf (not depicted) can comprise a padded material on an underside of the artificial turf, which simulates the natural feel and operation of a conventional golfing green.

The base 1006 is thicker on a front facing side 1008 of the modified golf ball 1002. This permits the conical spring 1004 to flex all the way to the ground when a force is applied to the front facing side (i.e., opposite of the modification) of the modified golf ball 1002 while still providing a desirable "teeing" height for the modified golf ball 1002. The conical spring 1004 further provides for a more natural feel when applying a force (e.g., hitting the modified golf ball 1002 with a golf club) to the modified golf ball 1002, since the conical spring 1004 can flex in a telescopic manner, both downward and outward. In addition, it is envisioned that a protective coating (not depicted) can be applied to at least a striking side (i.e., the front facing side) of the conical spring 1004 to alleviate damage that can occur to a club head if the club head were to strike the conical spring 1004.

With reference now to FIG. 10B, FIG. 10B gives a view of the exemplary golf training device 1000 as seen from a back facing side 1010 of the modified golf ball 1002.

Figure 11:
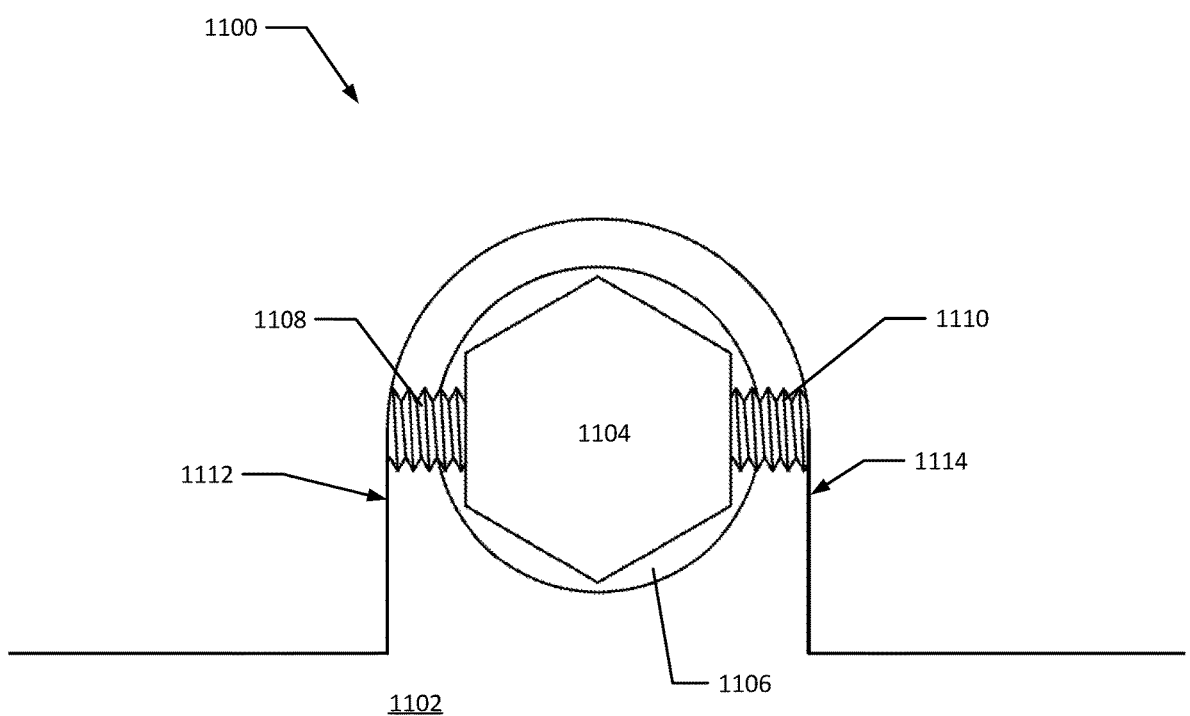
FIG. 11 is a bottom-up, zoomed-in view of an exemplary device for securing and limiting rotation of a coupling device for the modified ball.

With reference now to FIG. 11, a bottom-up view of a device 1100 for limiting rotation of a bolt is depicted. The device 1100 comprises a base 1102, a bolt 1104, a cavity 1106 in which the bolt 1104 sits, a first pin 1108, and a second pin 1110. The first and second pins 1108, 1110 restrict the movement including rotational motion of the bolt 1104.

In an exemplary embodiment, the bolt 1104 is set within the cavity 1106 and affixed into place with a bolt nut (not depicted) on an opposite side of the cavity 1106 until snug. Subsequently, the first and second pins 1108 and 1110 are inserted through the edges 1112 and 1114 of the base 1102 until they touch a side of the bolt 1104 or enter into a hole or threaded hole on a side of the bolt 1104 so as to restrict the bolt 1104 from rotating and becoming loose. It is noted that one of the pins 1108, 1110 may be sufficient. It is further noted, that more than two pins 1108, 1110 may be used. In an example, for a six sided bolt head, six pins may be inserted through the base such that a single pin touches or enters into every side of the bolt head. In an embodiment, the pins may include, but are not limited to ring, roll, or cotter pins, in addition to tapered or straight bolt fasteners that are either threaded or otherwise mechanically fastened throughto the vertical connecting structure.

Figure 12:
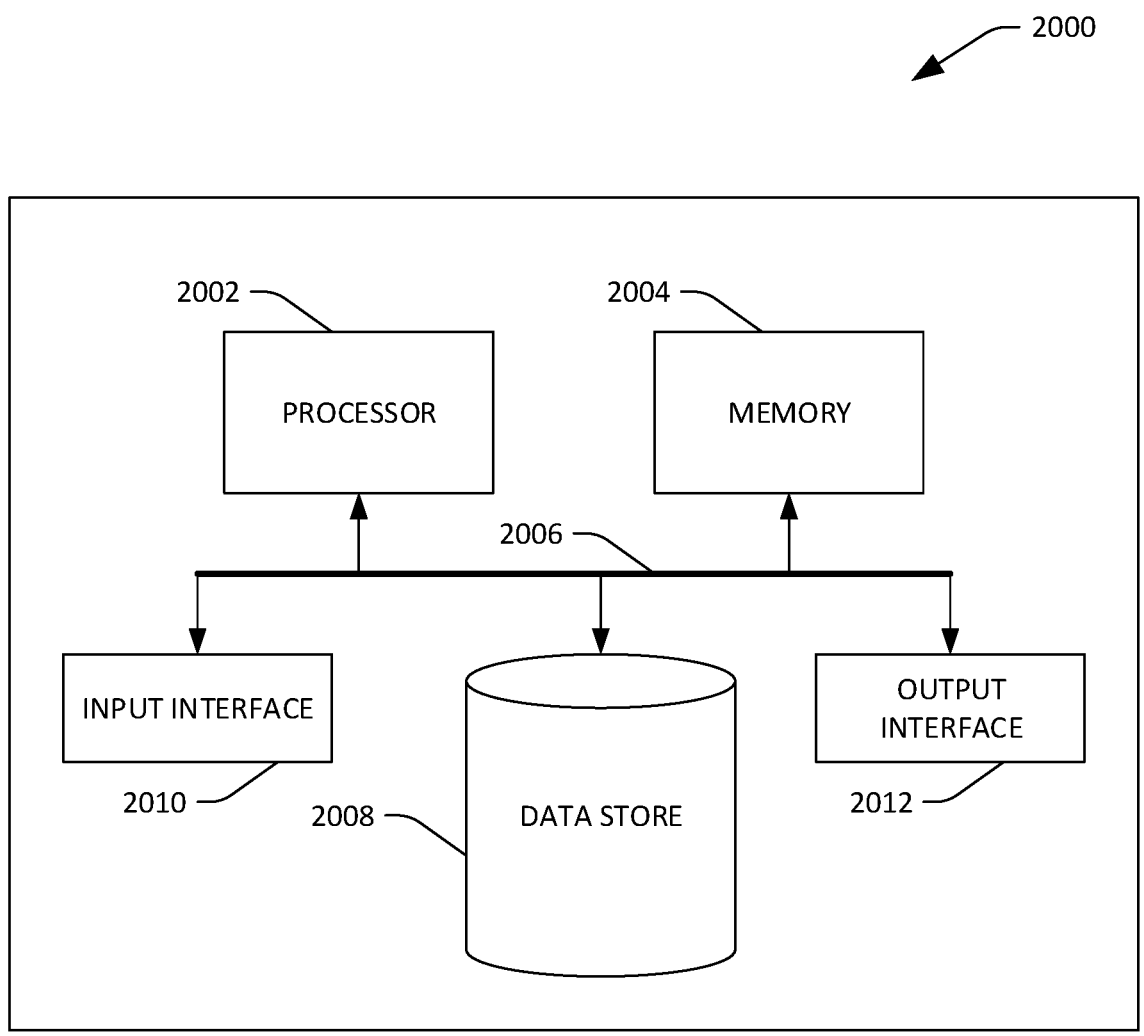
FIG. 12 is a schematic of an example computing device for use in the methods and devices described herein.

Referring now to FIG. 12, an illustration of an exemplary computing device 2000 that can be used in accordance with the sport ball training device disclosed herein is illustrated. In an example, FIG. 12 is an example of a computing device interfacing with the apparatus of FIG. 2.

The computing device 2000 includes data storage 2008 that is accessible by a processor 2002 by way of the system bus 2006. The data storage 2008 may include executable instructions to operate the processor 2002 and other components. The computing device 2000 also includes an input interface 2010 that allows external devices to communicate with the computing device 2000. For instance, the input interface 2010 may be used to receive instructions from an external computer device, from a user, etc. The computing device 2000 also includes an output interface 2012 that interfaces the computing device 2000 with one or more external devices. For example, the computing device 2000 may display text, images, etc. by way of the output interface 2012. In another example, the computing device 2000 may display a visual simulation of a soccer videogame by way of the output interface 2012.

It is contemplated that the external devices that communicate with the computing device 2000 via the input interface 2010 and the output interface 2012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 2000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 2000 may be a distributed system. Thus, for instance, several devices may be in communication by way of a network connection and may collectively perform tasks described as being performed by the computing device 2000.

As used herein, the term "system" is intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and BLU-RAY (BD), where disks usually reproduce data magnetically and discs usually reproduce data optically with lasers. Further, in an example, a propagated signal is not included within the scope of computer-readable storage media or display data. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Furthermore, to the extent that the term "includes" is used in either the detailed description or the claims, such term is intended to be inclusive in a manner similar to the term "comprising" as "comprising" is interpreted when employed as a transitional word in a claim. The term "consisting essentially" as used herein means the specified materials or steps and those that do not materially affect the basic and novel characteristics of the material or method. If not specified above, any properties or measurements mentioned herein may be determined by applicable ASTM standards, or if an ASTM standard does not exist for the property, the most commonly used standard known by those of skill in the art may be used. The articles "a", "an", and "the" should be interpreted to mean "one or more" unless the context indicates the contrary.

The invention claimed is:

1. A ball training device comprising:
   a motion transfer member mounted vertically about a vertical axis, and at least partially extending into a modified ball, wherein a flexible portion of the motion transfer member at least partially extends into the modified ball;
   a base, coupled to a bottom portion of the motion transfer member;
   the modified ball coupled to a top portion of the motion transfer member;
   the modified ball having a front half with a kicking or striking surface and a back half, the back half being a radially truncated surface and having a maximum radius less than that of a maximum radius of the front half;
   wherein the front half comprises a radially curved outermost surface at the maximum radius of the front half, the back half comprises a radially curved outermost surface at the maximum radius of the back half; and wherein the front half and back half are in a horizontally opposed orientation in relation to the vertical axis.

2. The device of claim 1, wherein the motion transfer member is a double conical spring.

3. The device of claim 2, wherein the double conical spring has a midsection where the thickness is greatest that is on a plane with a bottom edge of the modified ball.

4. The device of claim 1, wherein the motion transfer member is a spring with a small outer diameter of 0.5 to 1.5 inches, a small inner diameter of 0.1 to 0.7 inches, and a wire diameter of 0.05 to 0.25 inches.

5. The device of claim 1, further comprising a positioning device, the positioning device including a first component coupled to the modified ball and a second component coupled to the base, the first component and second components configured to be in a nested configuration when the modified ball is in an initial position.

6. The device of claim 1, further comprising a position device, the positioning device including a first component coupled to the modified ball and a second component coupled to the base, wherein the first and second components include magnetic materials selected from electro- or permanent magnets, ferromagnetic materials or combinations thereof, and the first and second components are magnetically attracted.

7. The device of claim 1, further comprising a housing that surrounds a flexible portion of the motion transfer member inside the modified ball, the housing tapers around a top half portion of the motion transfer member.

8. The device of claim 1, wherein the modified ball comprises an inner layer and an outer layer, wherein the outer layer comprises a strength as determined by ASTM 3574-D that is less than that of the inner layer.

9. The device of claim 1, wherein the base comprises at least two lateral projections, wherein an angle between the at least two lateral projections is greater than 30 degrees and less than 180 degrees.

10. The ball training device of claim 1, wherein the motion transfer member is a conical spring and a bottom of the conical spring is recessed into the base.

11. The ball training device of claim 1, wherein the device is configured to allow a kick on the kicking or striking surface to follow through with the modified ball hitting a floor or base and not blocking a player's foot from following through.

12. The ball training device of claim 1, wherein the front half is a spherical segment or a prolate spherical segment.

13. The system of claim 1, wherein the modified ball is truncated 0.5 to 3 inches above a bottom tip of a spherical or prolate spherical shape of the ball.

14. A system comprising: a modified ball having a front half with a spheroid or prolate spheroid kicking surface and a back half being radially truncated surface having a maximum radius less than that of the front half; a base; a motion transfer member mounted vertically about a vertical axis and at least partially extending into the modified ball, the modified ball is coupled to the base via the motion transfer member; a sensor configured to receive input when a user interacts with the modified ball; a computing device configured to receive input from the sensor; wherein the system is configured to allow a kick on the kicking surface with the modified ball hitting a floor or the base and not blocking the kick from following through a full kicking motion; wherein the front half comprises a radially curved outermost surface at a maximum radius of the front half, and the back half comprises a radially curved outermost surface at the maximum radius of the back half; and wherein the front half and back half are in a horizontally opposed orientation in relation to the vertical axis.

15. The system of claim 14, wherein the sensor is housed within an internal hollow of the modified ball.

16. The system of claim 14, further comprising a display, wherein the computing device is in communication with the display, wherein input provided by a user interacting with the modified ball is depicted on the display.

17. The system of claim 14, wherein the computing device is running a video game depicting a simulation of the modified ball.

18. The system of claim 14, wherein the sensor is on an exterior layer of the modified ball or is on the base and configured to detect impacts of a back of the ball on the base.

19. The system of claim 14, wherein the motion transfer member is recessed into the modified ball such that 100% to 31% of the height of the motion transfer member is recessed within the modified ball.

20. A ball training device comprising: a motion transfer member mounted vertically about a vertical axis to a modified golf ball; a base, coupled to a bottom portion of the motion transfer member; the modified golf ball coupled to a top portion of the motion transfer member; the modified golf ball having a front half with a striking surface and a back half, the back half being a radially truncated surface having a maximum radius less than that of a maximum radius of the front half;

wherein the front half comprises a radially curved outermost surface at the maximum radius of the front half, and the back half comprises a radially curved outermost surface at the maximum radius of the back half; and wherein the front half and back half are in a horizontally opposed orientation in relation to the vertical axis.

* * * * *